United States Patent [19]

Sudhakar et al.

[11] Patent Number: 5,389,241
[45] Date of Patent: Feb. 14, 1995

[54] METHOD FOR SELECTIVE HYDRODENITROGENATION OF RAW OILS

[75] Inventors: Chakka Sudhakar, Wappingers Falls; Gerald G. Sandford, Glenham; Frank Dolfinger, Jr., Poughkeepsie, all of N.Y.

[73] Assignee: Texaco Inc., White Plains, N.Y.

[21] Appl. No.: 132,415

[22] Filed: Oct. 6, 1993

Related U.S. Application Data

[63] Continuation-in-part of Ser. No. 810,086, Dec. 19, 1991.

[51] Int. Cl.⁶ .................... C10G 45/04; C07C 7/00
[52] U.S. Cl. .................... 208/254 H; 208/216 R; 208/216 PP; 208/217; 208/143; 585/270
[58] Field of Search .............. 208/254 H, 112, 216 R, 208/216 PP, 217, 143; 502/185; 585/270

[56] References Cited

U.S. PATENT DOCUMENTS

| | | | |
|---|---|---|---|
| 1,965,956 | 7/1934 | Dunkel | 585/270 |
| 3,812,028 | 2/1973 | Wennerberg et al. | 208/112 |
| 4,108,761 | 8/1978 | Sze et al. | 208/254 H |
| 5,051,389 | 9/1991 | Lang et al. | 502/185 |

*Primary Examiner*—Helen M. S. Sneed
*Assistant Examiner*—Bekir L. Yildirim
*Attorney, Agent, or Firm*—Kenneth R. Priem; Vincent A. Mallare; Cynthia L. Kendrick

[57] ABSTRACT

A method of selectively hydrodenitrogenating various raw hydrocarbon oils such as various petroleum feedstocks, coal liquids, shale oils and sand oils, which method comprises passing the raw hydrocarbon oil along with hydrogen ($H_2$) over sulfided carbon supported Fe—Mo catalysts, whereby the raw hydrocarbon oil is hydrodenitrogenated with a selectivity significantly higher than that is possible with conventional alumina supported hydrotreating catalysts.

7 Claims, No Drawings

METHOD FOR SELECTIVE HYDRODENITROGENATION OF RAW OILS

CROSS REFERENCE TO RELATED APPLICATIONS

This is a continuation-in-part application of copending U.S. patent application, Ser. No. 07/810,086, filed Dec. 19, 1991.

BACKGROUND OF THE INVENTION

This invention relates to the selective hydrodenitrogenation (HDN) of raw oils, and more particularly to the use of sulfided carbon supported Fe—Mo catalysts to selectively hydrodenitrogenate hydrocarbon feedstocks.

Hydrodenitrogenation (HDN) is one of the most important reactions that take place during hydrotreating/hydroprocessing. Nitrogen compounds, if not removed, effectively poison the acidic fluid catalytic cracking (FCC), reforming and hydrocracking catalysts downstream. The importance of HDN has been steadily growing in recent years due to a variety of environmental and economic reasons.

HDN is much more difficult compared to other reactions such as hydrodesulfurization (HDS) and hydrodeoxygenation (HDO) that take place simultaneously during the hydrotreating operation. This is the reason why some industrial hydrotreating process conditions are dictated by the capability of the catalyst to remove nitrogen (nitrogen specification). So, catalysts that are more efficient for HDN are advantageous for the refining industry.

Conventional hydrotreating catalysts consist of different combinations of Mo or W promoted by Co or Ni, supported on alumina, with or without some additional promoters. All these catalysts are significantly more active for HDS than for HDN at any given reaction condition.

The carbon supported Fe—Mo catalysts of the present invention are as effective for HDN as they are for HDS. This indicates that the selectivity of these catalysts for Carbon-Nitrogen bond breaking (for HDN) is much higher than those of the conventional alumina supported hydrotreating catalysts. This is an unusual and useful property for a hydrotreating catalyst.

It is an object of the present invention to provide a catalyst system which would serve to selectively remove nitrogen from hydrocarbon feedstocks, i.e., the hydrodenitrogenation (HDN) of raw hydrocarbon oils.

DISCLOSURE STATEMENT

U.S. Pat. Nos. 4,666,878, and 4,820,677; Japanese Patents 61/157,350; 61/162,590 and 61/245,846; and European Patent Applications 181,693; 181,083; and 199,555 disclose the synthesis of unsupported and refractory inorganic oxide supported Fe—Mo—S catalysts using specific metal-sulfur complexes, which catalyst complexes had good activities for hydrodenitrogenation (HDN); but no mention was made of to the possibility of using carbon as the catalyst support for the Fe—Mo system.

U.S. Pat. No. 4,082,652 is directed to treatment of heavy oils, to effect hydrodesulfurization by use of a molybdenum/nickel or molybdenum/cobalt on carbon catalyst. The catalyst preparation requires that the molybdenum be deposited first, then sulfided, and only then that the nickel or cobalt be added.

U.S. Pat. No. 3,546,103 is directed to the removal of metals and coke from hydrocarbon resids by use of, as pre-catalyst, metals of Group IIB or. Group VIB plus Group VIII, on charcoal.

U.S. Pat. No. 3,367,862 is directed to desulfurization of heavy residual hydrocarbons by hydrolysis with water in the presence of catalyst on a char base.

U.S. Pat. No. 4,313,852 is directed to hydrotreating, particularly of coal liquids, in the presence of a sulfided molybdenum or tungsten on active carbon, with or without a second metallic component, in which catalysts the metal sulfides are substantially completely exist on the outer surface of the active carbon support. The carbon supported catalyst preparation according to U.S. Pat. No. 4,313,852 must involve direct deposition of metal sulfides on the carbon support and subsequent reduction of them to lower valent sulfides.

U.S. Pat. No. 3,812,028 is directed specifically to "hydrotreating" fossil fuels containing polynuclear aromatics such as asphaltenes, for converting the components boiling above 1000° F. to products boiling below 1,000° F. (this is actually hydrocracking), by the use of Group VI and/or Group VIII metals on carbon, at a hydrogen partial pressure in excess of 2,200 psig and at a temperature between 750° F. and 850° F.

U.S. Pat. No. 4,831,003 is directed to a catalyst composition, useful in hydrotreating processes, prepared by depositing a compound of a metal of Group IIB, IVB, IVA, VA, VIA, VIIA, or VIIIA onto a carbon support formed by partial combustion of an unsaturated hydrocarbon, simultaneous with the deposition of metal by vapor phase. The deposited metal is thereafter converted to an oxide or sulfide and used for hydrotreating.

U.S. Pat. No. 5,051,389 is directed to a method for preparing a catalyst composition for hydroconversion processes wherein the catalyst composition is formed by depositing one or more metal and/or metal compounds from vapor phase, at elevated temperatures, onto a preformed carbon support which has maximum dimension in any direction from about 50 Angstroms to about 5,000 Angstroms. The catalysts made according to U.S. Pat. No. 5,051,389 have to be added to or combined with the carbonaceous material to be hydrotreated in only 50 to 5,000 parts per million concentration, for the hydroconversion process to take place (one-pass application).

U.S. Pat. No. 3,725,303 is directed to treating of aqueous solutions of oxy-sulfur compounds (such as sodium thiosulfate) by use of a catalyst containing molybdenum sulfide and cobalt sulfide on a carbon support.

U.S. Pat. No. 1,965,956 is directed to the hydrogenation of aromatic initial compounds to hydroaromatic compounds with a gas consisting substantially of hydrogen under a pressure of at least 100 atmospheres, at a temperature between 200° C. and 350° C., in the presence of a "mixed catalyst" comprising metal compounds of group 1, group 6 and group 8 of the periodic table, on a wide variety of catalyst supports including active charcoal. The catalysts of U.S. Pat. No. 1,965,956 can also contain "activating admixture" selected from compounds of elements of groups 2 to 5 and of group 7 of the periodic system.

U.S. Pat. No. 4,176,051 is directed to a process for catalytically hydrocracking a heavy hydrocarbon oil, wherein the heavy hydrocarbon oil is slurried with a particulate catalyst mass comprising aluminum compound coated coal and/or coke particles which may also be coated with a cobalt and/or a molybdenum compound, and then reacted with hydrogen.

U.S. Pat. No. 2,608,521 is directed to a process for the desulfurization of "sulfur bearing" hydrocarbon oils using "sulfactive hydrogenation catalysts".

The "sulfactive hydrogenation catalysts" of U.S. Pat. No. 2,608,521 can consist of "oxides or sulfides of the transition metals" with or without stabilizers and promoters as the oxides and carbonates of a very large selection of metals, in combination with a large selection of various conventional supporting materials.

SUMMARY OF THE INVENTION

The present invention provides a one step method for selectively removing nitrogen by hydrodenitrogenation (HDN) from a raw hydrocarbon feedstock oil. The method comprises passing a raw oil with hydrogen ($H_2$) over sulfided carbon supported Fe—Mo catalysts, whereby the raw oil is selectively hydrodenitrogenated. "Selective hydrodenitrogenation" here is used to indicate the characteristic ability of these catalysts to effect hydrodenitrogenation selectively in such a way that the ratio of rate constants $k_{HDN}/k_{HDS}$ for these catalysts being very significantly higher compared to the conventional alumina supported Co/Ni/Mo/W hydrotreating catalysts.

The raw hydrocarbon oil of the present invention is selected from the group consisting of naphthas, middle distillates, gas oils, vacuum gas oils, coal liquids, shale oils, sand oils and residua.

DETAILED DESCRIPTION OF INVENTION

In developing the present invention, Fe—Mo/Carbon catalysts have been found to have excellent hydrodenitrogenation (HDN) activities for hydroprocessing light straight run gas oil (LSRGO), higher than those of the conventional alumina supported Ni—Mo and Co—Mo catalysts, even on an equal catalyst volume basis. The selectivity of these Fe—Mo/Carbon catalysts for carbon-nitrogen bond breaking is found to be much higher than those of the alumina supported Ni—Mo or Co—Mo catalysts. Even though Fe does not seem to promote the HDS activity of Mo/Carbon, it significantly promotes the HDN activity, indicating good synergism between the Fe and Mo for HDN. This is the first ever observation of its kind.

The Fe—Mo/Carbon catalysts of the present invention can be synthesized using conventional methods that are well known. The preferred support is activated carbon which may have a Brunauer-Emmett-Teller (BET) surface area of at least about 650 $m^2/g$, a pore volume for nitrogen of at least about 0.3 cc/g, an average pore diameter (by nitrogen physisorption) of at least about 0.8 nanometers (nm) with good crush strength and attrition resistance suitable for fixed bed application. The carbon is dried first in air at a suitable temperature to remove the physisorbed water. The catalytic metals can then be deposited on this carbon either simultaneously or sequentially, using any known methods of deposition such as incipient wetness impregnation, and equilibrium adsorption. The deposition can be effected using easily available compounds of Mo such as $MoO_3$, ammonium heptamolybdate tetrahydrate, etc. in an aqueous or non-aqueous medium. Any easily available compound of iron such as for example ferric nitrate nanohydrate can be used for the deposition of Fe. If the metals are deposited sequentially, it is preferable to deposit Mo first, followed by drying to remove the water and calcination in air or inert atmosphere. The Fe compound in aqueous or non-aqueous solution can then be deposited, followed by drying and calcination in air or inert atmosphere. It is not absolutely necessary to calcine the material at high temperatures after depositing the Mo compound. The drying and calcination steps are not absolutely necessary after depositing the Fe compound.

The catalysts of the present invention can constitute from about 0.5 to about 30% by weight of molybdenum and from about 0.1 to about 10% by weight iron, measured as metals. Mo exists as an oxide or precursor to the oxide and Fe exists as oxide or as partially decomposed Fe compound in the prepared catalysts. The preferred ranges of loadings are from about 5 to about 18% by weight for Mo and from about 2.0 to about 8.0% by weight for iron.

The catalyst prepared as described above is then loaded into a hydrotreating reactor and sulfided in situ to convert the Mo and Fe compounds to their respective sulfides, which will be the active form of the catalyst. The sulfiding can be done using any known method such as heating in a stream of hydrogen sulfide/hydrogen or by flowing an easily decomposable sulfur compound such as carbon disulfide or dimethyl disulfide in a hydrocarbon solvent along with hydrogen gas over the catalyst at elevated temperatures up to, but not limited to 400° C. at atmospheric or elevated pressures. The sulfidation can also be effected by the sulfur compounds present in the petroleum fraction itself which is being hydrotreated. The catalyst can also be presulfided outside the reactor, suitably passivated and then can be loaded into the reactor. After sulfiding, the petroleum fraction is passed over the catalyst bed together with hydrogen gas at pressures ranging from 100–2,500 psig and temperatures ranging from 200° C.–450° C. at liquid hourly space velocities ranging from 0.1 to 10. Pure hydrogen gas or recycle gas containing largely hydrogen can be used at flow rates ranging from about 200 to about 10,000 SCFB.

The present method may be carried out at a temperature ranging from about 200° C. to about 450° C. and under a pressure ranging from about 100 to about 2,500 psig.

And in the method described herein, the raw hydrocarbon oil is passed over the catalyst at a LHSV ranging from about 0.1 to about 10, and the hydrogen ($H_2$) flows through the catalyst bed at a rate ranging from about 200 to about 10,000 SCFB.

The hydrogen flow may be made up of pure hydrogen, or a predominantly hydrogen containing gas mixture.

The following Examples illustrate the advantages of the present invention.

The activated carbon (different batches of the same carbon) used as the catalyst support for the present invention had BET surface areas ranging from about 1300 to about 1630 $m^2/g$, the nitrogen pore volumes ranging from about 0.64 to about 0.8 cc/g and the average pore radius ranging from about 0.99 to about 1.12 nm measured from the nitrogen physisorption data. It was obtained from the American Norit Company as 3 mm pellets. The activated carbon was crushed and sieved and the fraction between 20 and 40 mesh was used without any further treatment to prepare the catalysts described below.

EXAMPLE 1

Preparation Of Mo/Carbon (Catalyst C1)

5.9 g of ammonium heptamolybdate.$4H_2O$ (AHM) was dissolved in 15 g of fresh deionized water. 25 g of the activated carbon was impregnated with this solution to incipient wetness. It was left at room temperature with occasional stirring for 2 hours. It was then heated slowly at 0.3° C./min to 115° C. in a temperature programmable forced air circulation oven, was left at that temperature for 24 hours, and then cooled slowly to room temperature in about 3 hours time. The resulting material is referred to as catalyst C1. The Mo in catalyst C1 exists probably as partially decomposed ammonium molybdate. If all the AHM would have decomposed to Mo trioxide, it would contain 16.2% by weight molybdenum trioxide, the balance being carbon support.

EXAMPLE 2

Preparation Of Fe/Carbon (Catalyst C2)

9.5 g of ferric nitrate.$9H_2O$ (FEN) was dissolved in 24 g of fresh deionized water. 40 g of activated carbon was impregnated with this solution to incipient wetness. The impregnated material was left in the fume hood at room temperature with occasional stirring for 3 weeks to remove the water. Most of the water was eliminated by this treatment, but not completely. This is referred to as catalyst C2. Catalyst C2 contains 3% Fe (calculated as metal, but existing as partially decomposed nitrate) by weight. The balance is carbon support.

EXAMPLE 3

Preparation Of Fe—Mo/Carbon (Catalyst C3)

In this Example, Example 1 was repeated in full, except that 40 g of activated carbon was used instead of 25 g, 8.0 g of AHM instead of 5.9 g, and 24 g of deionized water instead of 15 g. The resulting material was impregnated with a solution made up of 10.5 g of FEN in 20 g of deionized water. The impregnated material was left in the fume hood at room temperature with occasional stirring for 3 weeks to remove the water. Most of the water was eliminated by this treatment, but not completely. This is referred to as catalyst C3. Catalyst C3 would contain 13.5% by weight Mo trioxide and 4.3% by weight ferric oxide if both AHM and FEN would have transformed completely to the respective oxides. In the catalyst, Mo exists as partially decomposed AHM and Fe exists as partially decomposed nitrate.

EXAMPLE 4

Preparation Of Fe—Mo/Carbon (Catalyst C4)

In this Example, Example 3 was repeated in full except that 70 g of activated carbon was used instead of 40 g, 25.8 g of AHM in 50 g of deionized water instead of 8 g of AHM in 24 g of water, and 50.7 g of FEN in 24 g of deionized water instead of 10.5 g of FEN in 20 g of water. The resulting material is referred to as catalyst C4. Catalyst C4 contains 21% by weight Mo trioxide and 10% by weight ferric oxide if both AHM and FEN would have transformed completely to the respective oxides. In the prepared catalyst, Mo exists as partially decomposed AHM and Fe exists as partially decomposed nitrate, as in example 3.

EXAMPLE 5 (COMPARATIVE)

Preparation Of Ni—Mo/$Al_2O_3$ (Catalyst 5)

Gamma alumina was ground into 20–40 mesh and calcined in air flow at 500° C. for 3 hours. It has a BET surface area of 260 $m^2/g$ and a pore volume of 0.73 cc/g by mercury porosimetry. The calcined material has a pore volume of 0.83 cc/g for water.

Step 1

37.5 g of calcined 20–40 mesh alumina was impregnated to incipient wetness with a solution made up of 11.1 g of AHM in 29 g of deionized water. The impregnated material was kept at room temperature with occasional stirring for 2 hours and then heated at 0.3° C./min to 115° C. in the temperature programmable forced air circulation oven. It was left at that temperature for 24 hours and then was cooled slowly in 3 hours to room temperature. It was then heated in air flow (1000 ml/min.) to 500° C. in 3 hours, left at that temperature for 3 hours, and then was cooled to room temperature in about 4 hours in air flow.

Step 2

The calcined material from step 1 was impregnated to incipient wetness with a solution containing 7.3 g of nickel(II) nitrate.$6H_2O$ in 24 g of deionized water. The impregnated material was left at room temperature for 2 hours with occasional stirring. Later it was heated at 115° C. in air and then calcined at 500° C. in air flow. This is referred to as catalyst C5. Catalyst C5 contains 18.6% $MoO_3$ and 3.8% NiO by weight, the balance being alumina.

EXAMPLE 6 (COMPARATIVE)

Preparation Of Ni—Mo/$Al_2O_3$ (Catalyst 6)

In this Example, comparative example 5 was repeated in full, except that 12.1 g of nickel(II) nitrate.$6H_2O$ was used instead of 7.3 g. This is referred to as catalyst C6. Catalyst C6 contains 18.5% $MoO_3$ and 6.3% NiO by weight, the balance being alumina.

EXAMPLE 7 (COMPARATIVE)

Preparation Of Co—Mo/$Al_2O_3$ (Catalyst 7)

In this Example, comparative example 5 was repeated in full, except that 7.3 g of Cobalt(II) nitrate.$6H_2O$ was used instead of 7.3 g of Nickel(II) nitrate.$6H_2O$. This resulting material is referred to as catalyst C7. Catalyst C7 contains 18.6% $MoO_3$ and 3% Cobalt (calculated as metal, but existing as oxide) by weight, the balance being alumina.

EXAMPLE 8

Evaluation of Catalysts for Hydrotreating

Catalysts C1 through C7 were evaluated for their HDN and HDS activities in a standard hydrotreating reactor using techniques well known to those familiar with the art. In a typical experiment, 10 cc of the catalyst is loaded into the hydrotreating reactor of 12 mm ID and 40 cm long. After purging off of oxygen from the reactor, 100 cc/min of a sulfiding gas consisting of 10% $H_2S$ in hydrogen is passed through the catalyst bed for 15 min at room temperature at 1 atmosphere pressure. With the sulfiding gas flowing, the temperature of the reactor is increased at 3° C./min to 350° C., and kept at the sulfiding temperature of 350° C. for 2 hours. The temperature of the reactor is then lowered to the reaction temperature, usually 300° C., the sulfiding gas still flowing. At this point, a back pressure of about 100 psig is applied to the reactor, and the liquid feed flow is started at the desired flow rate, usually at 30 cc/hour. Once the liquid had passed over and beyond the catalyst bed, the flow of the sulfiding gas is cut off, the flow of hydrogen started at the desired rate, and the reactor pressure increased to the desired pressure, usually 700 psig. The actual hydrotreating reaction is considered to have started at this point of time. Some experiments were conducted using 20 cc catalyst bed. The gas and liquid flow rates were appropriately calculated and used in such cases.

After about 16 hours on stream, the liquid product samples were collected and were sparged with hydrogen gas to remove the dissolved $H_2S$ and $NH_3$ gases before they were analyzed for their sulfur and nitrogen contents. 16 hours was found be more than sufficient to attain steady state activities under the reaction conditions employed. The extent of sulfur removal (% HDS) and nitrogen removal (% HDN) were calculated from these analyses.

The liquid feed used for all the experiments presented here was a light straight run gas oil (LSRGO) having the properties and composition given below in Table 1. It should be mentioned here that even though LSRGO was used as the feed in the examples presented here, the catalysts of the present invention are applicable for processing various petroleum fractions ranging from naphthas to vacuum gas oils, and residua.

TABLE 1

| Properties of LSRGO | |
| --- | --- |
| Gravity | 35.9° |
| IBP | 478° F. |
| 10% | 503° F. |
| 50% | 536° F. |
| 90% | 592° F. |
| FBP | 648° F. |
| S, wt. % | 1.40 |
| N, ppm | 80 |
| Aromatics (vol. %) | 30 |

The S and N concentrations of the feed and product samples were determined by X-ray fluorescence (XRF) ASTM #D2622, and Chemiluminescence (ASTM #ST447) techniques respectively. The two sets of reaction conditions viz., 300° C., 700 psig, LHSV=3, $H_2$ flow=1600 SCFB (Condition 1) and 350° C., 600 psig, LHSV=3, $H_2$ flow=1600 SCFB (Condition 2), employed in the present investigation were chosen in such a way that only partial HDS and HDN occur under these conditions. This helps us to compare the activities of different catalysts at identical reaction conditions in order to rank them. The rate constants $kS_2$ and $kN_1$ which are the second order rate constant for sulfur removal and first order rate constant for nitrogen removal respectively were calculated from the observed conversions for each catalyst at each reaction condition and are presented in Table 2. Also presented in table 2 are the actual % HDS and % HDN values, and the ratio of rate constants $kN_1/kS_2$, which is a measure of the relative catalyst selectivity for HDN compared to HDS.

Due to the possible errors associated with measuring low nitrogen concentrations, it is appropriate to compare the HDN activities of various catalysts observed at the second reaction condition of 350° C. and 600 psig. The % HDS values observed at the first condition of 300° C. and 700 psig will be used to compare (rank) all the catalysts for their HDS activities in the following discussion. The following observations can be made from the data presented in Table 2.

(a) The HDN activities of the Fe—Mo/Carbon catalysts C3 and C4 (Condition 2 of Runs # 3 and 4) are comparable to those of the alumina supported Co—Mo (C7) and Ni—Mo (C5 and C6) catalysts (Condition 2 of Runs # 5, 6, and 7). But, the HDS activities of the Fe—Mo/Carbon catalysts are significantly lower than those of the alumina supported Ni—Mo or Co—Mo catalysts (Condition 1 of Runs # 3, 4, 5, 6 and 7).

(b) Catalyst C2, which is 3% Fe/Carbon has extremely low HDS and HDN activities at reaction conditions 1 and 2 (Run #2).

(c) Catalyst C1, which is Mo/Carbon has low HDS and HDN activities at reaction conditions 1 and 2 (Run #1).

(d) The values of the ratio of rate constants for the nitrogen removal to the sulfur removal, $kN_1/kS_2$, which is a measure of the catalyst selectivity for HDN compared to HDS, at reaction conditions 1 and 2 are significantly (several times) larger for the Fe—Mo/Carbon catalysts (C3 and C5) compared to those for the alumina supported Co—Mo (C7) and Ni—Mo (C5 and C6) catalysts (Runs # 3, 4, 5, 6 and 7). This indicates that the Fe—Mo/Carbon catalysts are comparatively much more selective for the HDN reaction. In other words, these Fe—Mo/Carbon catalysts can break the C—N bonds more efficiently compared to the conventional alumina supported Ni—Mo or Co—Mo catalysts. It should be noted here that the Mo/Carbon (C1) and Fe/Carbon (C2) catalysts also have larger $kN_1/kS_2$ values (Runs # 1 and 2).

(e) It should be mentioned here that all these catalytic activity comparisons (presented in table 2 and discussed above) were made on an EQUAL CATALYST VOLUME basis. Since activated carbon has significantly lower density (0.4–0.5 g/cc) compared to the alumina support (>0.6 g/cc), on an EQUAL WEIGHT basis, these carbon supported Fe—Mo catalysts are significantly more active for HDN than the conventional alumina supported Co—Mo or Ni—Mo catalysts.

Several investigators reported in the literature that there is little or no synergy between Fe and Mo for the HDS activity. From Table 2, if we add up the % HDS values of catalysts C1 (Mo/Carbon) and C2 (Fe/Carbon) at the first reaction condition (Runs #1 and 2 in Table 2), we find that the total % HDS value equals to 22.8+10.4=33.2. The HDS conversion of the catalyst C3 (Fe—Mo/Carbon) at the first condition is 35.6% (Runs #3), which indicates little or no synergy between Fe and Mo for HDS. Similarly, adding the % HDS conversions for the catalysts C1 and C2 at the second reaction condition gives a value of 56.3+23.6=79.9 (Runs #1 and 2). The % HDS conversions of the catalysts C3 and C4 at the second condition are 87.0 and 83.9 respectively (Runs #3 and 4), also clearly showing that there is very little or almost no synergy between the Fe and Mo in the catalyst for the HDS reaction, supporting the reports of previous investigators.

To find out whether there is synergy between Fe and Mo for the HDN reaction, we shall repeat the similar calculation done above, this time for the HDN activities. Catalysts C1 (Mo/Carbon) and C2 (Fe/Carbon) gave % HDN conversions of 33.3 and 5.1 respectively at reaction condition 2 (Runs #1 and 2). This adds up to 38.4. But, catalysts C3 (Fe—Mo/Carbon) and C4 (Fe—Mo/Carbon) gave % HDN conversions of 63.4 and 70.1 respectively (Runs #3 and 4), both of these being significantly larger than 38.4. These results clearly show the significant positive synergy between the Fe and Mo on the carbon support for the HDN reaction.

The following important conclusions can be drawn from the results presented in Table 2.

(a) In carbon supported Fe—Mo catalysts, there is good synergistic effect between the Fe and Mo for Carbon-Nitrogen bond breaking, resulting in their high HDN activities. Even though Fe does not promote the HDS activity of Mo/Carbon catalysts, it significantly promotes the HDN activity.

(b) At reaction conditions similar to those employed in the industry, using a real petroleum fraction as the feed, on an equal catalyst volume basis, the HDN activities of carbon supported Fe—Mo catalysts are comparable to those of conventional alumina supported Ni—Mo or Co—Mo catalysts, which are normally used in the industry for this kind of operation. On an equal weight basis, they are significantly more active than the conventional catalysts.

(c) The selectivity of the Fe—Mo/Carbon catalysts for Carbon-Nitrogen bond breaking (hydrogenolysis) and hydrodenitrogenation (removal of nitrogen as $NH_3$), relative to Carbon-Sulfur bond breaking, is much (several times) larger compared to those of alumina supported Ni—Mo or Co—Mo catalysts.

We claim:

1. A one-step method for selectively removing nitrogen from a raw hydrocarbon oil which comprises reacting said raw hydrocarbon oil with hydrogen over a sulfided carbon supported Fe—Mo catalyst under hydrodenitrogenation conditions, including a temperature of from about 200° C. to about 450° C. and a pressure from about 100 to about 2500 psig, wherein said carbon support has a BET surface area of at least about 650 $m^2/g$, a pore volume for nitrogen of at least about 0.3 cc/g and an average pore diameter of at least about 0.8 nanometers.

2. The method of claim 1, wherein said raw hydrocarbon oil is selected from the group consisting of naphthas, middle distillates, gas oils, vacuum gas oils, coal liquids, shale oils, sand oils and vacuum resids.

3. The method of claim 1, wherein said catalyst contains from about 0.5 to about 30 wt. % of Mo and from about 0.1 to about 10 wt. % of Fe.

4. The method of claim 3, wherein said catalyst contains from about 5.0 to about 18 wt. % of Mo and from about 2.0 to about 8.0 wt. % of Fe.

5. The method of claim 1, wherein said raw hydrocarbon oil is passed over said catalyst at a LHSV value ranging from about 0.1 to about 10, and said hydrogen flows through said catalyst at a rate ranging from about 200 to about 10,000 SCFB.

6. The method of claim 1, wherein said hydrogen flow is made up of pure hydrogen or a predominantly hydrogen containing gas mixture.

7. The method of claim 1, wherein said carbon support consists of predominantly carbon, selected from the group consisting of activated carbons, coal chars, carbon-alumina composites, and composites of carbon-refractory inorganic oxides/clays comprising of greater than 70 wt. % carbon.

TABLE 2

Experimental Results of Catalyst Evaluations

| Run # | Catalyst Code | Catalyst | % Mo | % Fe | % Ni (Co) | LHSV | temp. (°C.) |
|---|---|---|---|---|---|---|---|
| 1. | C1 | Mo/Carbon | 10.8 | 0.0 | 0.0 | 3.0 | 300 |
|  |  |  |  |  |  | 3.0 | 350 |
| 2. | C2 | Fe/Carbon | 0.0 | 3.0 | 0.0 | 3.0 | 300 |
|  |  |  |  |  |  | 3.0 | 350 |
| 3. | C3 | Fe—Mo/Carbon | 9.0 | 3.0 | 0.0 | 3.0 | 300 |
|  |  |  |  |  |  | 3.0 | 350 |
| 4. | C4 | Fe—Mo/Carbon | 14.0 | 7.0 | 0.0 | 3.0 | 350 |
| 5. | C7 | Co—Mo/Alumina | 12.4 | 0.0 | 3.0 | 3.0 | 300 |
|  |  |  |  |  |  | 3.0 | 350 |
| 6. | C5 | Ni—Mo/Alumina | 12.4 | 0.0 | 3.0 | 3.0 | 300 |
|  |  |  |  |  |  | 3.0 | 350 |
| 7. | C6 | Ni—Mo/Alumina | 12.1 | 0.0 | 4.9 | 3.0 | 300 |
|  |  |  |  |  |  | 3.0 | 350 |

| Run # | Pressure (psi) | H2 flow (SCFB) | % HDS | % HDN | k(S)2 | k(N)1 | kN1/kS2 |
|---|---|---|---|---|---|---|---|
| 1. | 700 | 1600 | 22.8 | 18.5 | 1.2 | 1.23 | 1.01 |
|  | 600 | 1600 | 56.3 | 33.3 | 5.3 | 2.43 | 0.46 |
| 2. | 700 | 1600 | 10.4 | 1.3 | 0.5 | 0.08 | 0.16 |
|  | 600 | 1600 | 23.6 | 5.1 | 1.3 | 0.31 | 0.24 |
| 3. | 700 | 1600 | 35.6 | 23.2 | 2.3 | 1.58 | 0.70 |
|  | 600 | 1600 | 87.0 | 63.4 | 27.5 | 6.03 | 0.22 |
| 4. | 600 | 1600 | 83.9 | 70.1 | 21.9 | 7.25 | 0.33 |
| 5. | 700 | 1600 | 69.7, | 26.3 | 9.5 | 1.83 | 0.19 |
|  | 600 | 1600 | 97.9 | 68.8 | 195.9 | 6.98 | 0.04 |
| 6. | 700 | 1600 | 63.2 | 26.7 | 6.6 | 1.86 | 0.28 |
|  | 600 | 1600 | 97.2 | 66.7 | 135.7 | 6.59 | 0.05 |
| 7. | 700 | 1600 | 65.2 | 27.9 | 7.7 | 1.96 | 0.25 |
|  | 600 | 1600 | 97.4 | 68.6 | 153.8 | 6.95 | 0.05 |

For all the above experiments:
Feed: Light Straight Run Gas Oil containing 1.4 wt. % sulfur, 80 ppm by wt. nitrogen and 30 vol. % aromatics.
All the catalytic activities reported are on equal catalyst volume basis and are stabilized initial activities.
All catalysts were presulfided using 10 vol. % hydrogen sulfide in hydrogen at 350 C. for 3 hours.
Catalyst charge was 10 cc for all experiments except for #4 and #5 which used 20 cc.

* * * * *